(12) United States Patent
Takasaka et al.

(10) Patent No.: US 8,584,153 B2
(45) Date of Patent: Nov. 12, 2013

(54) OPTICAL DISC DEVICE

(75) Inventors: Daisuke Takasaka, Osaka (JP); Tetsuya Tamura, Osaka (JP); Masaki Nakatani, Osaka (JP); Katsuo Ichinohe, Osaka (JP); Rikiya Ueshima, Osaka (JP); Tomohiro Kobayashi, Osaka (JP); Yoshiyuki Nakagawa, Osaka (JP); Yasuhide Mizuta, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/466,210

(22) Filed: May 8, 2012

(65) Prior Publication Data

US 2012/0324486 A1    Dec. 20, 2012

(30) Foreign Application Priority Data

Jun. 16, 2011    (JP) .................................. 2011-134490

(51) Int. Cl.
*G11B 17/028*    (2006.01)

(52) U.S. Cl.
USPC ........................................................ 720/706

(58) Field of Classification Search
USPC .............................................. 720/706–714
See application file for complete search history.

(56) References Cited

U.S. PATENT DOCUMENTS

| 2005/0071862 A1* | 3/2005 | Asabata ........................ 720/710 |
| 2005/0097589 A1* | 5/2005 | Hara et al. .................... 720/710 |
| 2005/0223401 A1 | 10/2005 | Fukasawa |

FOREIGN PATENT DOCUMENTS

| JP | 62222475 A | * | 9/1987 |
| JP | 2000030331 A | * | 1/2000 |
| JP | 2004-185774 A | | 7/2004 |
| JP | 2005158212 A | * | 6/2005 |
| JP | 2007-265526 | | 10/2007 |
| JP | 2008052851 A | * | 3/2008 |
| JP | 2008-243303 | | 10/2008 |
| JP | 2011-103157 A | | 5/2011 |
| JP | 2011113601 A | * | 6/2011 |
| JP | 2011113602 A | * | 6/2011 |

* cited by examiner

*Primary Examiner* — Will J Klimowicz
(74) *Attorney, Agent, or Firm* — Morgan, Lewis & Bockius LLP

(57) ABSTRACT

An optical disc device comprises a disc clamper. The disc clamper is provided with: a first member provided with a first circular disc, and with a plurality of upstanding pieces formed with predetermined spaces therebetween along a circle concentric to the first circular disc, the upstanding pieces having an engaging claw at the distal end thereof; and a second member provided with a second circular disc in which are formed a plurality of through-holes into which the plurality of upstanding pieces are inserted, and with a plurality of peripheral walls formed with predetermined spaces therebetween along a circle concentric to the second circular disc. Rotation in a state where the upstanding pieces have been inserted into the through-holes through the spaces between the peripheral walls causes the engaging claws to engage the peripheral walls.

5 Claims, 7 Drawing Sheets

FIG.5

OPTICAL DISC DEVICE

This nonprovisional application claims priority under 35 U.S.C. §119(a) on Patent Application No. 2011-134490 filed in Japan on Jun. 16, 2011, the entire contents of which are hereby incorporated by reference.

BACKGROUND OF THE INVENTION

1. Field of the Invention

The present invention relates to an optical disc device for recording and/or playback of optical discs such as DVDs, CDs, and the like, and relates in particular to an optical disc device having an improved disc clamper for clamping the optical disc.

2. Description of Prior Art

In optical disc devices that employ, as recording media, optical discs, such as compact discs (CDs), digital versatile discs (DVD), Blu-Ray discs (BDs), and the like, laser light emitted by an optical pickup is focused onto a recording face of the optical disc to record data, and (or) laser light irradiating the recording face and reflected therefrom is detected to play back information.

In optical disc devices of the prior art, a traverse chassis on which an optical pickup and a turntable have been installed is attached at the back edge thereof in a vertically rotatable manner to a loader chassis. Above the turntable, a disc clamper is rotatably attached in an opening of a clamper support of a main chassis. When the optical disc is placed on a disc tray and fed in between the turntable and the disc clamper, the traverse chassis is lifted (rotated upward) by a cam slider, and the optical disc is caused to rotate with the rim of the center opening of the optical disc clamped by the turntable and the disc clamper, while the optical disc is irradiated with a laser beam from the optical pickup, to record or playback information.

One type of optical disc clamper system employed in an optical disc device of this kind is a magnet system, in which a magnet and a yoke are embedded within the disc clamper, while another yoke is provided on the upper face of the turntable, the optical disc being clamped between this disc clamper and the turntable. The purpose of the yokes is to minimize leakage of magnetic force produced by the magnetic member of the magnet.

Figure 6A:
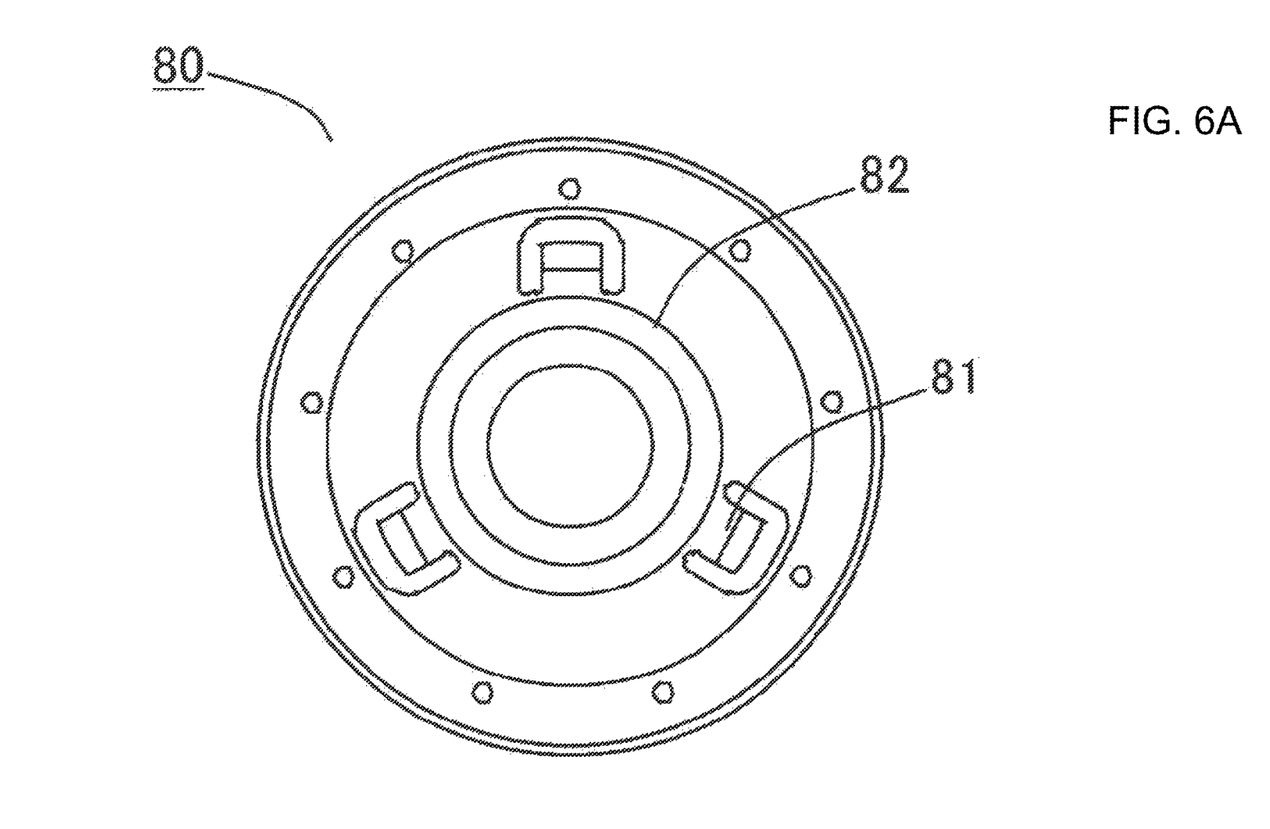
FIG. 6A is a perspective view of a first member of a disc clamper provided to a conventional optical disc device.
Figure 6B:
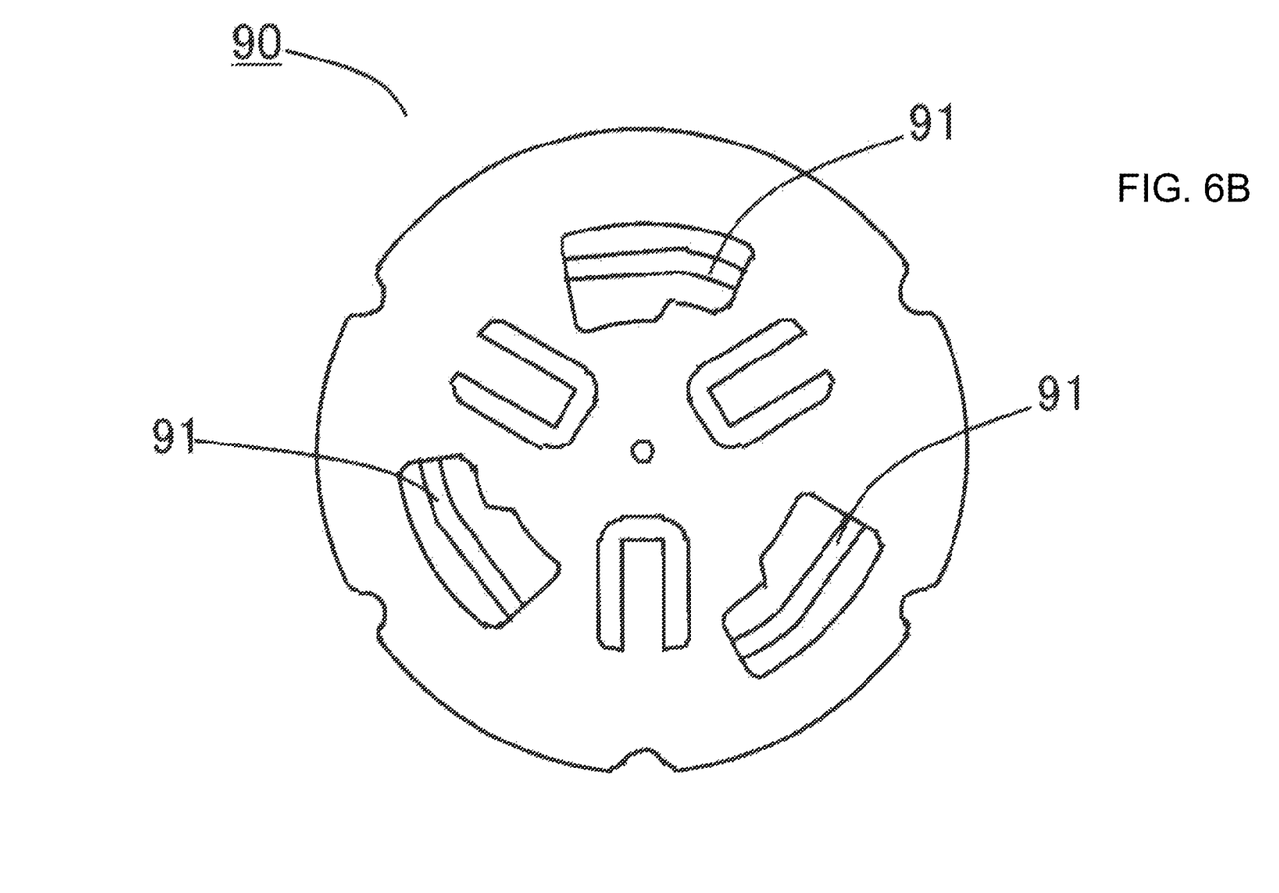
FIG. 6B is a perspective view of a second member of a disc clamper provided to a conventional optical disc device.

A disc clamper of conventional magnet design will be described with reference to FIG. 6. A disc clamper of conventional magnet design is provided with a first member (lower clamper) 80 as shown in FIG. 6A, a second member 90 (upper clamper) as shown in FIG. 6B, a magnet, and yoke. For example, the magnet and the yoke are positioned on the first member 80 in that order, and then covered with the second member 90 in such a manner that the magnet and the yoke are sandwiched between the first member 80 and the second member, whereupon the first member 80 and the second member 90 are fastened together to complete assembly of the disc clamper of magnetic design.

The assembly process for a conventional disc clamper shall now be described in detail. Firstly, the first member 80 on which the magnet and the yoke have been positioned is covered with the second member 90, whereby a ring 91 provided to the second member 90 becomes engaged by engaging claws formed at the upper ends of upstanding pieces 81 provided to the first member 80. In so doing, vertical movement of the second member 90 relative to the first member 80 is restricted. Next, with the ring 91 engaged by the engaging claws of the upstanding pieces 81, the second member 90 is rotated by a small amount in the counterclockwise direction, to thereby mate a projecting boss (not shown), provided to the second member 90, with an interlocking slot (not shown) provided to the first member 80. In so doing, rotation of the second member 90 relative to the first member 80 is restricted. A ring 82 of the first member 80 and the ring 91 of the second member 90 form the main trunk of the disc clamper which clamps the yoke and the magnet.

In a configuration for a disc device disclosed in Japanese Laid-open Patent Application 2008-243303, a clamper is provided with a lower clamper and an upper clamper. As the assembly procedure for this clamper, firstly, the lower clamper and the upper clamper are overlapped in such a manner that the upper face of a projecting boss of the lower clamper and the bottom face of the basal portion of the upper clamper are abutting. In the disclosure, the upper clamper is then turned clockwise to bring about engagement between an engaging claw of the upper clamper and an engaging slot of the lower clamper, as well as to fit the boss of the lower clamper into a boss hole in the upper clamper, thereby preventing separation of the engaging claw from the engaging slot.

In a configuration for a disc device recited in Japanese Laid-open Patent Application 2007-265526, a clamper is provided with a resin plate and a metal plate. As the assembly procedure for this clamper, in the disclosure, the metal plate is disposed over the resin plate, and in this state the metal plate is then turned slightly toward the clockwise direction with respect to the resin plate, thereby catching three hooks of the resin plate onto three small holes in the metal plate, in order to link the resin plate and the metal plate to one another.

In a disc clamper of a design in which a ring (peripheral wall) forming the main trunk of a disc clamper provided to a first member is engaged by a projecting piece provided to a second member, thereby restricting vertical movement of the first member relative to the second member, the first member is covered by the second member in the above manner, thereby restricting vertical movement of the first member relative to the second member (simultaneously with respect to the covering).

On the other hand, in order to restrict rotation of the first member relative to the second member in a state in which vertical movement of the first member relative to the second member has been restricted in the above manner, it has been necessary to rotate the first member by a small amount (rotated counterclockwise in FIG. 6), to mate the projecting boss provided to the first member with the interlocking slot provided to the second member.

However, in the assembly process, attachment is deemed to be complete at the point in time that the first member is covered by the second member, and it sometimes occurs that attachment to the disc device occurs in a state in which rotation of the first member relative to the second member is unrestricted (a faulty assembly state).

SUMMARY OF THE INVENTION

With the foregoing in view, it is an object of the present invention to provide an optical disc device provided with a disc clamper that prevents faulty assembly.

The optical disc device of the present invention for attaining the aforedescribed object is an optical disc device provided with a disc clamper, characterized in that the disc clamper is provided with: a first member provided with a first circular disc, and with a plurality of upstanding pieces formed with predetermined spaces therebetween along a circle concentric to the first circular disc, the upstanding pieces having an engaging claw at the distal end thereof; and a second member provided with a second circular disc in which are formed a plurality of through-holes into which the plurality of upstanding pieces are inserted, and with a plurality of peripheral walls formed with predetermined spaces therebetween along a circle concentric to the second circular disc; wherein rotation in a state where the upstanding pieces have been inserted into the through-holes through the spaces between the peripheral walls causes the engaging claws to engage the peripheral walls.

According to this configuration, the peripheral walls are formed with predetermined spaces therebetween, whereby, when the upstanding pieces are inserted into the throughholes through the predetermined spaces, there is no contact between the engaging claws formed at the distal ends of the upstanding pieces, and the peripheral walls (the peripheral walls are not engaged by the engaging claws). That is, in the absence of rotation in a state where the upstanding pieces have been inserted into the through-holes, vertical movement of the first member relative to the second member is unrestricted. Consequently, the disc clamper will not be deemed to be completely assembled at a stage where the upstanding pieces have been inserted into the through-holes, and faulty assembly can be prevented from occurring.

In the optical disc device having the aforedescribed configuration, preferably, a projecting piece is formed in at least one through-hole among the plurality of through-holes.

According to this configuration, in a state where the engaging claws of the upstanding pieces have engaged the peripheral walls, when force is applied to the first member or to the second member in the disengaging direction, rotation thereof is inhibited by contact of the upstanding piece and the projecting piece, and therefore the engaging claws of the upstanding pieces and the peripheral walls do not become disengaged.

In the optical disc device having the aforedescribed configuration, preferably, the periphery of a section of the second circular disc where the through-holes having the projecting pieces are formed is reduced in thickness relative to the thickness of the periphery of a section where the through-holes having no projecting piece are formed.

According to this configuration, because the periphery of a section of the second circular disc where the through-holes having the projecting piece are formed is reduced in thickness, the flexibility of the projecting piece in the vertical direction is enhanced, and upward pushing of the projecting piece is facilitated. In so doing, ease of operation in assembly of the disc clamper, and ease of operation in disassembly of the disc clamper, can be improved.

In the optical disc device having the aforedescribed configuration, preferably, the first member forms a pair with a turntable and clamps the optical disc, and the second member is turnably supported on a clamper support.

According to this configuration, in the first member which forms a pair with a turntable and clamps the optical disc, no through-holes for insertion of the upstanding pieces are formed, and therefore diminished strength of the first member can be prevented.

According to the present invention, by forming the peripheral walls with predetermined spaces therebetween, when the upstanding pieces are inserted into the through-holes, there is no contact between the engaging claws formed at the distal ends of the upstanding pieces, and the peripheral walls (the peripheral walls are not engaged by the engaging claws). In other words, in the absence of rotation in a state where the upstanding pieces have been inserted into the through-holes, vertical movement of the first member relative to the second member is unrestricted. Consequently, the disc clamper will not be deemed to be completely assembled at the stage where the upstanding pieces have been inserted into the through-holes, and faulty assembly can be prevented from occurring.

DESCRIPTION OF PREFERRED EMBODIMENTS

The following description of the optical disc device of the present invention employs the example of a Blu-ray disc (BD) playback device. The embodiment herein illustrates merely one example of the optical disc device of the present invention for the purpose of embodying the technical concept of the present invention. There is no intention to identify the present invention solely in terms of this optical disc device, and the invention may be implemented in analogous fashion in devices of other embodiments included within the scope of the claims.

Figure 1:
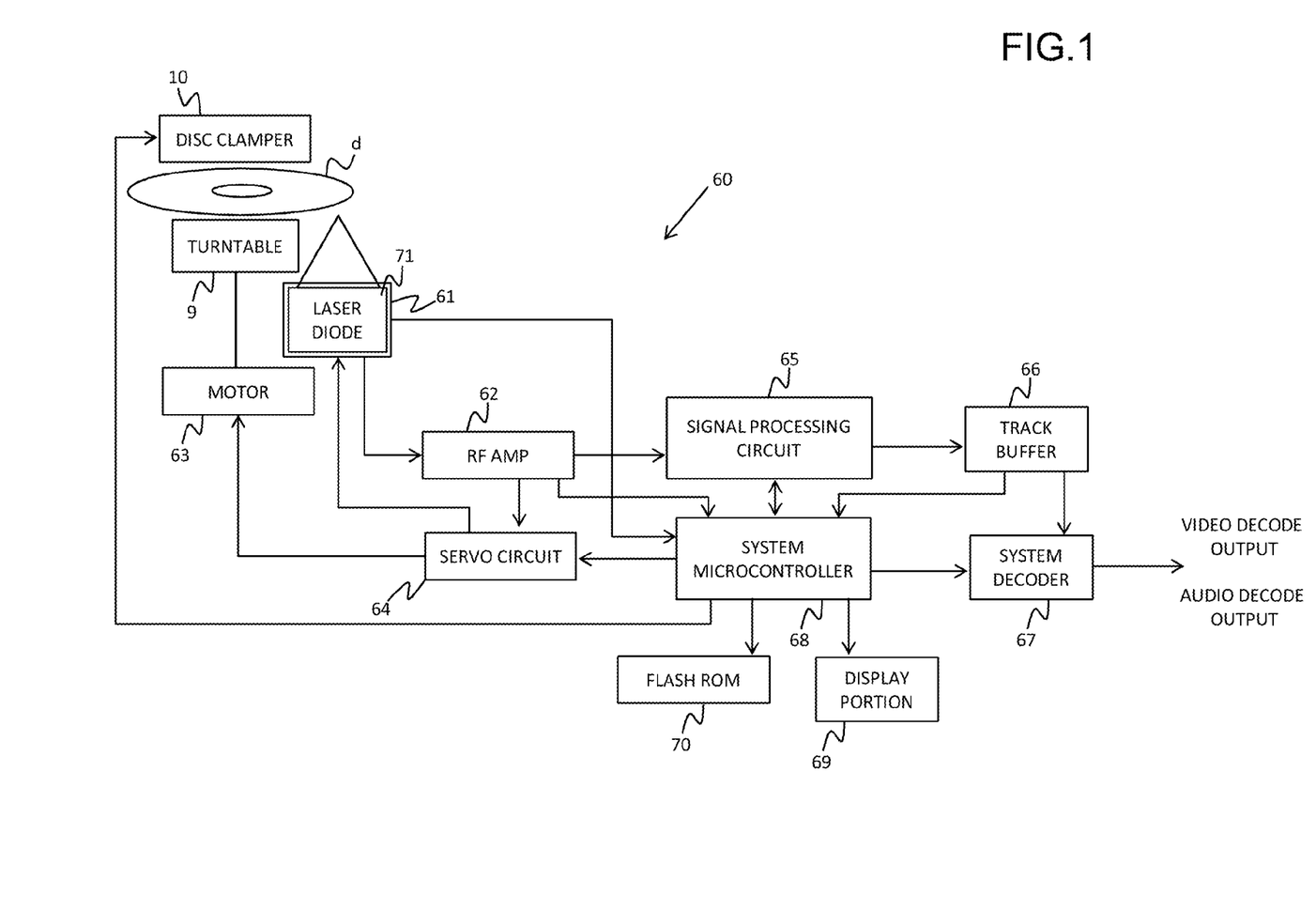
FIG. 1 is a block diagram showing the configuration of a BD playback device as an example of the optical disc device of the present invention.

FIG. 1 is a block diagram showing the configuration of the BD playback device 60. The BD playback device 60 is provided with an optical pickup 61, an RF amp 62, a motor 63, a servo circuit 64, a signal processing circuit 65, a track buffer 66, a system decoder 67, a system microcontroller (controller) 68, a display section 69, and a flash ROM 70.

An optical disc d which has been loaded into a disc tray is positioned on a turntable 9, clamped by the turntable 9 and a disc clamper 10, and caused to rotate together with the turntable 9, driven by the motor 63.

The optical pickup 61 irradiates the recording face of the optical disc d with laser light of a specific wavelength, and receives reflected light therefrom, which is converted to an electrical signal (reflected light detection signal). The optical pickup 61 supplies this reflected light detection signal to the RF amp 62. The optical pickup 61 is moveably supported in the diametrical direction of the optical disc d, by a predetermined guide shaft or the like, so that target data can be read out appropriately from the optical disc d.

Here, due to temperature changes or degradation over time, a laser diode 71 for playback installed on the optical pickup 61 will experience changes in output laser intensity, even in cases of flow of the same drive current thereto. Accordingly, the optical pickup 61 may be designed, for example, to detect the laser intensity output by the laser diode 71, and adjust the drive current in such a way that laser intensity is brought to a value for which the playback process is possible. The adjusted drive current values (Iop) are recorded to the flash ROM 70, etc.

From the reflected light detection signal supplied by the optical pickup 61, the RF amp 62 generates an RF signal, a tracking signal, a focus signal, etc. Furthermore, it generates a binary signal through digitization of the RF signal. The RF amp 62 supplies the generated tracking signal, etc., to the servo circuit 64, and supplies the generated binary signal as a playback signal to the signal processing circuit 65.

The motor 63 comprises a spindle motor or the like, for causing a predetermined turntable on which the optical disc d has been installed to rotate. The motor 63 is controlled by the servo circuit 64, and drives rotation of the optical disc d, for example, at a constant linear speed.

The servo circuit 64 controls the driving of the motor 63, and drives rotation at a predetermined rotation speed. The servo circuit 64 also controls the driving of a thread motor (not shown) by the tracking signal supplied by the RF amp 62, and moves the optical pickup 61 appropriately in the diametrical direction of the optical disc d.

The signal processing circuit 65 demodulates the playback signal supplied from the RF amp 62, and then performs error correction, etc. The signal processing circuit 65 sequentially supplies the track buffer 66 with the demodulated data obtained through demodulation, etc.

The track buffer 66 comprises RAM of predetermined capacity, and the like; and sequentially saves the demodulated data supplied from the signal processing circuit 65. The demodulated data saved in the track buffer 66 is supplied in succession to the system decoder 67.

The system decoder 67 decodes the demodulated data supplied from the track buffer 66, and generates video data, audio data, etc. The system decoder 67 supplies the generated video data, audio data, etc. to a predetermined AV amp or the like.

The system microcontroller 68 comprises, for example, a single-chip microcontroller or the like provided with a ROM, a RAM, and a CPU, and controls the entire BD playback device 10. For example, the system microcontroller 68 establishes an address of target data to be read out, and controls the servo circuit 64, etc., to search for the target data at the established address. The searched target data is then read from the optical disc d, the signal control circuit 15 is controlled to carry out demodulation, error correction, or other functions on the read out target data (playback signal), and the demodulated data is stored in the track buffer 66. The system microcontroller 68 repeatedly performs a series of these operations comprising establishing an address, searching, readout, demodulation/error correction, data storage, or other function according to the free capacity of the track buffer 66.

In parallel with these operations, the system microcontroller 68 controls the system decoder 67 to decode the demodulated data stored in the track buffer 66, and successively plays back the video data, audio data, or the like.

The display section 69 comprises a liquid crystal display (LCD) panel or the like, and displays the operating status of the BD playback device 10, and the like.

Figure 2:
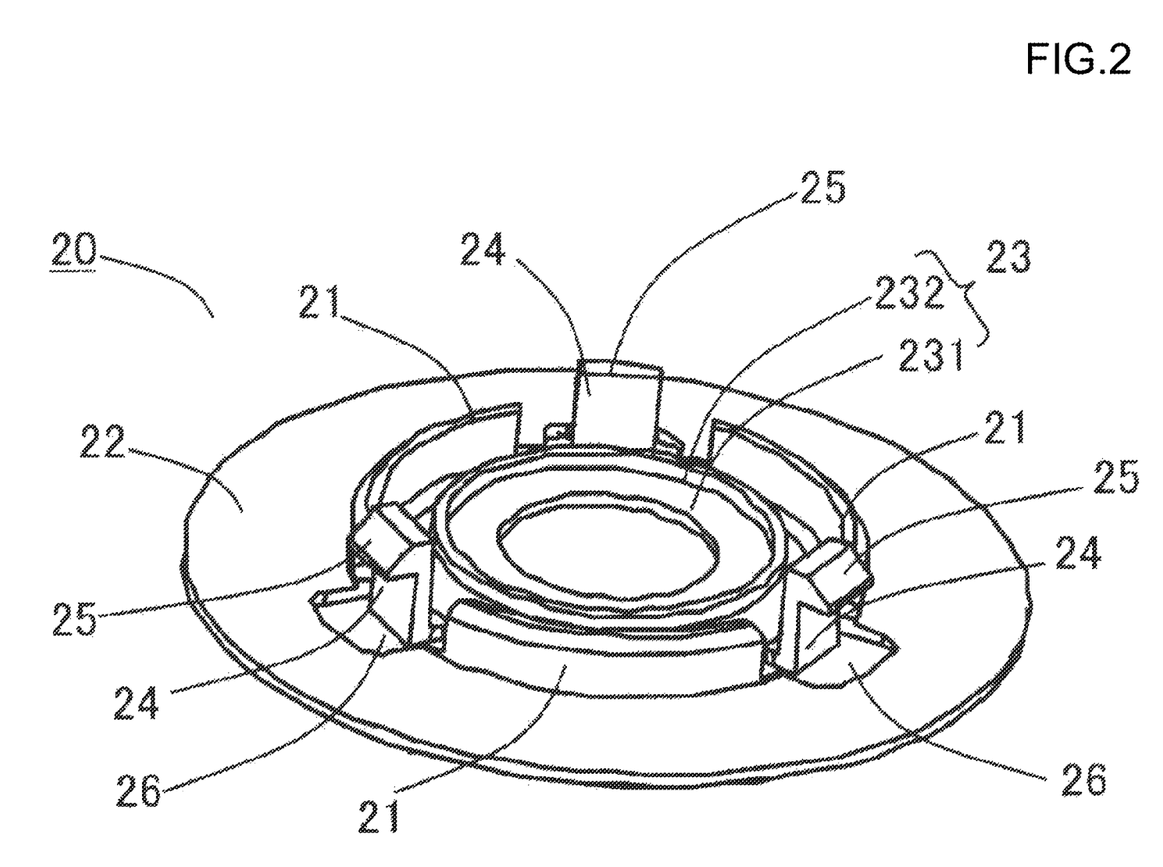
FIG. 2 is a top perspective view of a first member provided to the disc clamper provided to the optical disc device of the present invention.
Figure 3:
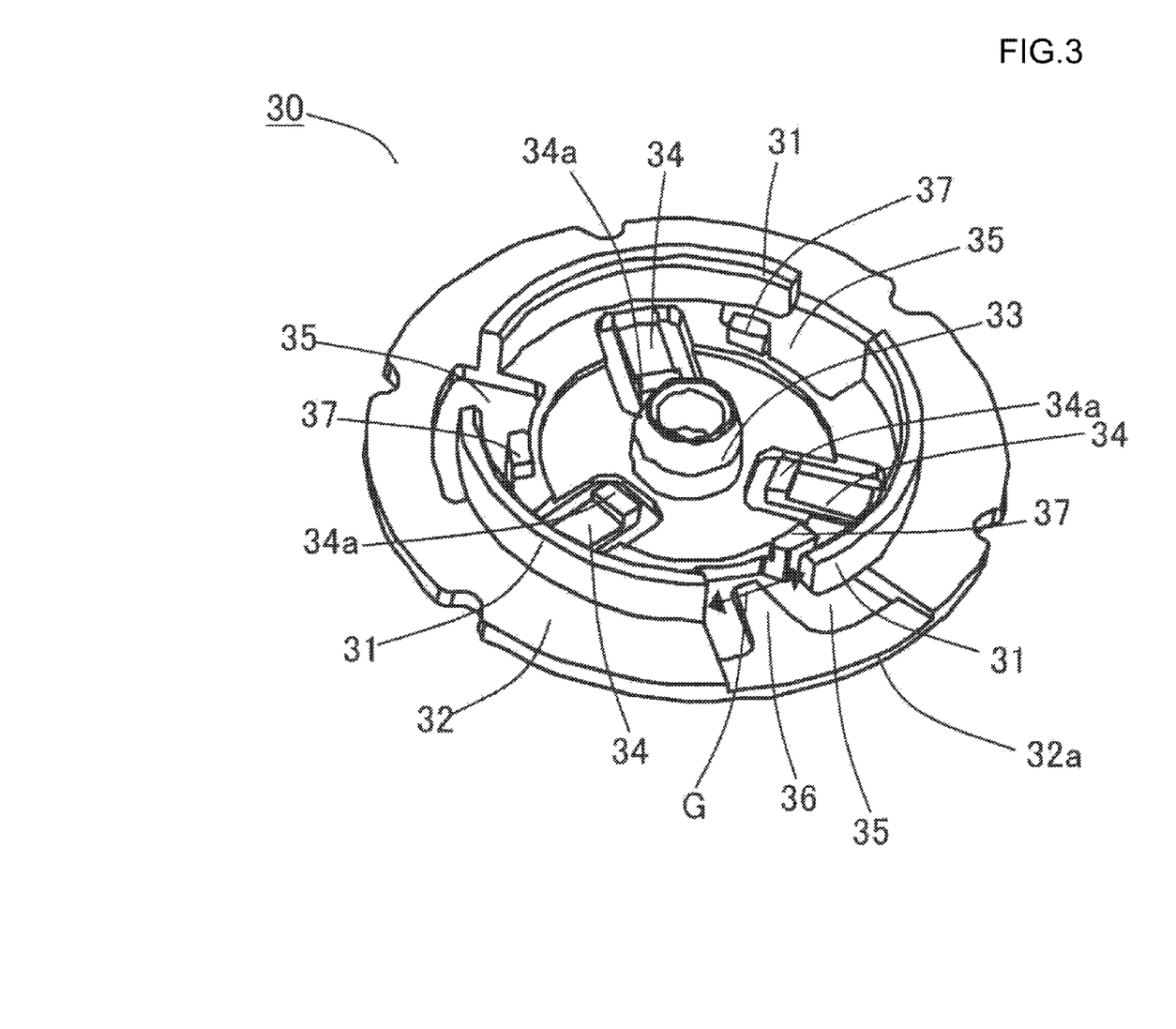
FIG. 3 is a bottom perspective view of a second member provided to the disc clamper provided to the optical disc device of the present invention.
Figure 4:
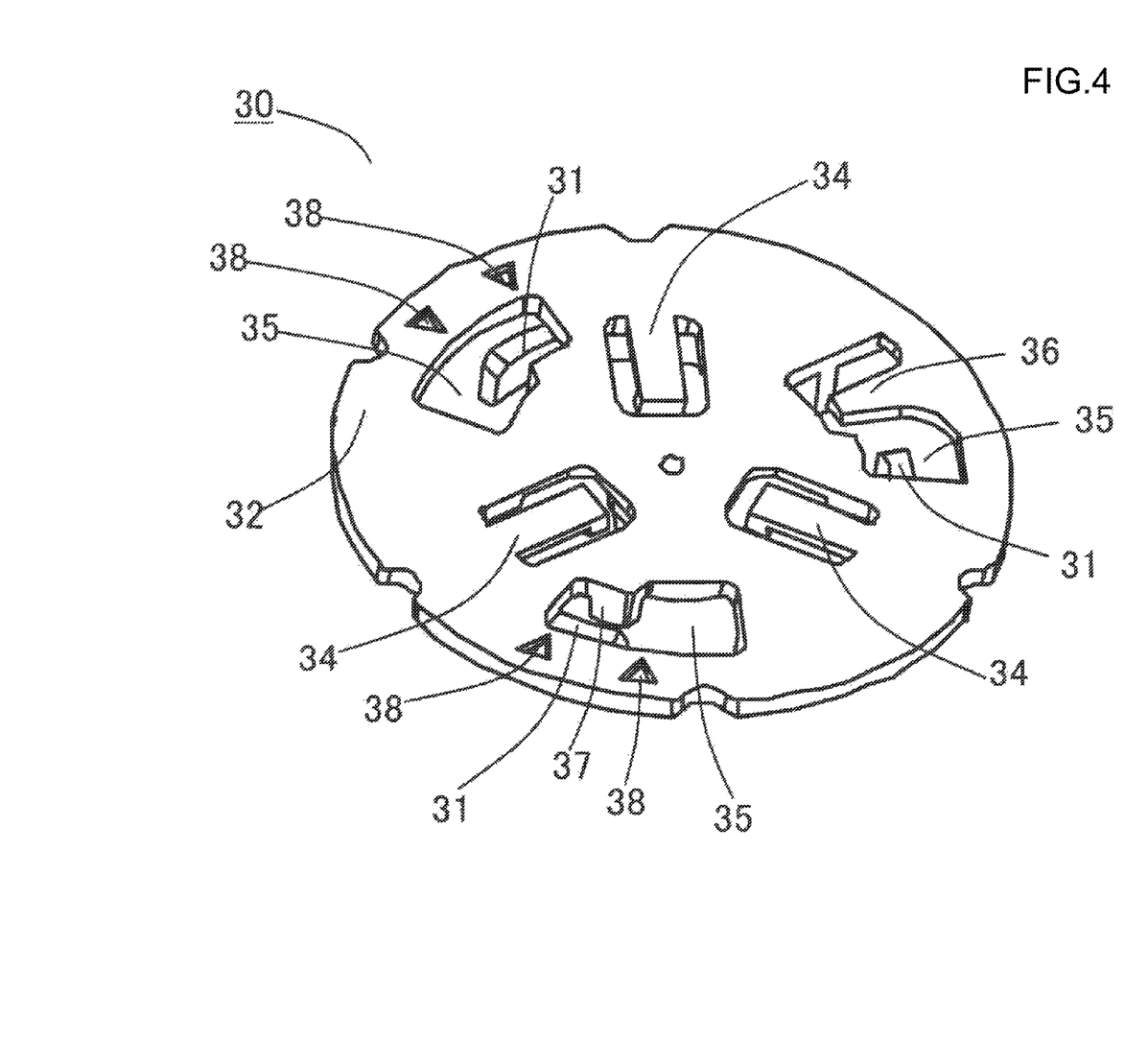
FIG. 4 is a top perspective view of the second member provided to the disc clamper provided to the optical disc device of the present invention.

Next, a disc clamper provided to the optical disc device of the present invention shall be described with reference to the accompanying drawings. FIG. 2 is a top perspective view of a first member provided to the disc clamper provided to the optical disc device of the present invention. FIG. 3 is a bottom perspective view of a second member provided to the disc clamper provided to the optical disc device of the present invention. FIG. 4 is a top perspective view of the second member provided to the disc clamper provided to the optical disc device of the present invention.

The disc clamper 10 is provided with a cylindrical portion constituted of a plurality of first peripheral walls 21 formed with predetermined spaces therebetween, and a plurality of second peripheral walls 31 formed with predetermined spaces therebetween; a first circular disc 22 provided concentrically to one axial end of the cylindrical portion; and a second circular disc 32 provided concentrically to the other axial end of the cylindrical portion. The first peripheral walls 21 and the first circular disc 22 constitute an integrally molded first member 20, and the second peripheral walls 31 and the second circular disc 32 constitute an integrally molded second member 30. Specifically, in other words, the disc clamper 10 is provided with the first member 20 and the second member 30.

In the disc clamper 10, the first member 20 is adapted to clamp an optical disc between itself and a turntable (the turntable 9 shown in FIG. 1), while the second member 30 is supported rotatably, as well as displaceably in the axial direction, by a clamper support (not illustrated). Specifically, the disc clamper 10 approaches the turntable 9 through rotation of the clamper support in a state with the second member 30 (the disc clamper 10 provided with the second member 30) supported on the clamper support, and the optical disc is clamped by the first member 20 (the disc clamper 10 provided with the first member 20) and the turntable 9.

(First Member)

FIG. 2 is a top perspective view of a first member (lower clamper) 20 provided to the disc clamper 10.

In the center portion of the first member 20, there is formed a magnet-retaining portion 23 of recessed annular shape. The magnet-retaining portion 23 comprises a magnet-positioning portion 231 in which a magnet 40 is positioned, and a small peripheral wall 232 formed bordering the perimeter of the magnet-positioning portion 231. The magnet-retaining portion 23 retains the magnet 40 which has been positioned on the magnet-positioning portion 231. When a yoke 50 is positioned over the magnet 40, the magnet-retaining portion 23 also serves to retain the yoke 50.

To the outside of the small peripheral wall 232, first peripheral walls 21 and substantially "L" shaped upstanding pieces 24 are formed alternating in increments of three, along a circle concentric with the small peripheral wall 232. The upstanding pieces 24 are bordered at the perimeters thereof by cutouts (interlock holes) 26 cut out in shapes substantially resembling a "C," and are linked to the first circular disc 22 at the inside peripheral side of the upstanding pieces 24.

Engaging claws 25 are formed at the distal ends (upper ends) of the upstanding pieces 24. When the upstanding pieces 24 are inserted into through-holes 35 of the second member 30 (discussed later) and the second member 30 is rotated, the engaging claws 25 engage the second peripheral walls 31 of the second member 30, thereby performing the function of fastening the first member 20 and the second member 30.

In the present embodiment, the first peripheral walls 21 and the upstanding pieces 24 are formed in alternating fashion; however, it is also acceptable, for example, to give the first peripheral wall 21 an annular shape, and to form three upstanding pieces 24 projecting at predetermined spaces along the upper face of the annular first peripheral wall 21.

(Second Member)

FIG. 3 is a bottom perspective view of the second member 30 provided to the disc clamper 10. FIG. 4 is a top perspective view of the second member 30 provided to the disc clamper 10.

As shown in FIG. 3, in the center portion of the second circular disc 31, a center holder 33 is formed concentrically to the second circular disc 31. The center holder 33 is inserted into the center hole of the yoke 50, which is magnetically coupled to the annular magnet 40 positioned in the magnet positioning portion 231 of the first circular disc 22, and the center hole of the yoke 50 magnetically coupled with the magnet 40, thereby centering the magnet 40 and the yoke 50.

To the outside of the center holder 33, three holding pieces 34 that have been separated into a "U" shape from the second circular disc 32, and that have holding portions 34a formed at the distal ends thereof so as to project toward the interior of the disc clamper 10, are formed with predetermined spaces therebetween along a circle concentric with the second circular disc 32. The holding pieces 34 constitute holding means for holding down, toward the first circular disc 22 of the first member 20, the magnet 40 and the yoke 50 built into the disc clamper 10, whereby the magnet 40 and the yoke 50 can be retained securely inside the disc clamper 10.

To the outside of the holding pieces 34, three second peripheral walls 31 are formed with predetermined spaces G respectively therebetween, along a circle concentric with the second circular disc 32. The spaces G are formed in order that, when the upstanding pieces 24 of the first member 20 are inserted into the through-holes 35, discussed below, there is no contact between the second peripheral walls 31 and the upstanding pieces 24 (the second peripheral walls 31 are not engaged by the engaging claws 25 of the upstanding pieces 24). In other words, the upstanding pieces 24 are inserted into the through-holes 35 through the spaces G.

Three through-holes 35 into which the upstanding pieces 24 formed on the first circular disc 22 are inserted, and which expose portions of the upper face of the second peripheral walls 31, are formed in the outside peripheral portion of the second circular disc 32. Of the three through-holes 35, one of the through-holes 35 has, formed therein, a projecting piece 36 that extends in the radial direction of the second circular disc 32 from the inner peripheral wall of the through-hole 35, so as to cover a portion of the space G. When the second peripheral walls 31 are engaged by the engaging claws 25 of the upstanding pieces 24, this projecting piece 36 prevents the first member 20 or second member 30 from rotating in the direction of disengagement (discussed in detail below).

Protruding portions 37 that protrude out toward the inside of the disc clamper 10 are formed at the inner peripheral side of the through-holes 35. In the state where the upstanding pieces 24 have been inserted into the through-holes 35, when the first member 20 or the second member 30 is rotated, causing the engaging claws 25 of the upstanding pieces 24 to engage with the second peripheral walls 31, the protruding portions 37 sandwich the upstanding pieces 24 against the second peripheral walls 31, and perform a function of reliably engaging the engaging claws 25 of the upstanding pieces 24 with the second peripheral walls 31 (discussed in detail below).

The periphery of the section of the second circular disc 32 where the through-holes 35 having the projecting piece 36 are formed (32a in the drawing) is reduced in thickness, relative to the thickness in other sections (meaning the periphery of the sections where through-holes 35 having no projecting piece 36 are formed; sections other than 32a in the drawing). In so doing, the flexibility of the projecting piece 36 in the vertical direction (the axial direction of the second peripheral walls 31) is increased, wherefore the ease of operation in assembly of and ease of operation in disassembly of the disc clamper 10 can be enhanced, as will be discussed below.

Despite reduced thickness in to the periphery of the section where the projecting pieces 36 are formed (32a in the drawing), the rigidity of the projecting piece 36 in the circumferential direction of the second circular disc 32 is undiminished, and therefore during normal use, the engaging claws 25 of the upstanding pieces 24 do not disengage the second peripheral walls 31.

As shown in FIG. 4, because of the formation of the through-holes 35 in the second circular disc 32 of the second member 30, the upper face side of the second peripheral walls 31 is exposed in top view. Moreover, as mentioned previously, the second peripheral walls 31 are formed with predetermined spaces G therebetween, in such a manner that there is no contact between the upstanding pieces 24 of the first member 20 and the second peripheral walls 31 when the upstanding pieces 24 are pushed through the through-holes 35, whereby the open areas of the through-holes 35 have areas in which the upper face side of the second peripheral walls 31 are exposed as well as areas overlapping the predetermined spaces G, these areas having their border in the substantially central portion of the through-holes 35 in the arcuate direction.

In proximity to the outside peripheral rim of the through-holes 35, there are formed two substantially triangular recesses 38, which represent locations of rotation (discussed in detail below). In the present embodiment, the recesses 38 have not been formed in proximity to the outside peripheral rim of the through-hole 35 in which the projecting piece 36 is formed; however, recesses 38 could be formed here as well.

Figure 5:
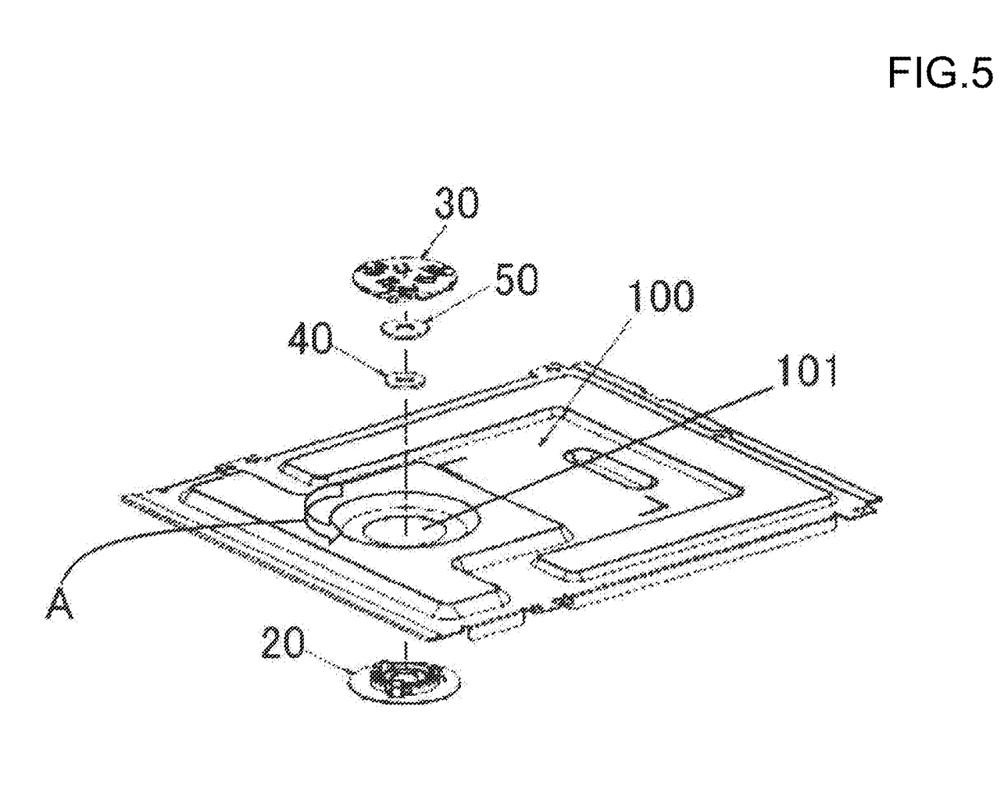
FIG. 5 is a top perspective view showing an additional example of a first member provided to the optical disc device of the present invention.

Next, the procedure for assembling the disc clamper provided to the optical disc device of the present invention will be described with reference to the accompanying drawings. FIG. 5 is an exploded perspective view of a disc clamper provided to the optical disc device of the present invention. A clamper cover 100 serves as a cover chassis covering an upper part of a main frame (main chassis) of the optical disc device.

Firstly, the first member 20 is brought close to the clamper cover 100 from the bottom face side of the clamper cover 100, and the first peripheral walls 21 of the first member 20 are inserted into a hole 101 formed in the clamper cover 100.

Next, in the state where the first peripheral walls 21 of the first member 20 have been inserted into the hole 101, the magnet 40 and yoke 50 are then positioned in this order onto the magnet-positioning portion 231 of the first member 20, from the upper face side of the clamper cover 100.

The reason for positioning the magnet 40 and yoke 50 in this sequence onto the magnet-positioning portion 231 is that, in a clamper design in which the optical disc is clamped by a disc clamper and a turntable, the positional relationship of the yoke and the magnet built into the disc clamper must be one in which the magnet is disposed toward the turntable side and the yoke is disposed toward the clamper support side (above the magnet), in order for magnetic attracting force to be generated between the magnet of the disc clamper and the yoke of the turntable.

In the preceding description, in the state where the first peripheral walls 21 of the first member 20 have been inserted into the hole 101, the magnet 40 and yoke 50 are then positioned in that order onto the magnet-positioning portion 231 of the first member 20, from the upper face side of the clamper cover 100; however, it is also acceptable to position the magnet 40 and yoke 50 onto the magnet-positioning portion 231 beforehand, followed by insertion of the first peripheral walls 21 of the first member 20 into the hole 101.

Next, the second member 30 is brought close to the clamper cover 100 from the upper face side of the clamper cover 100, and the second peripheral walls 31 of the second member 30 are inserted into the hole 101 formed in the clamper cover 100, and the second member 30 is arranged to cover the first member 20, such that the upstanding pieces 24 of the first member 20 are inserted into the through-holes 35 of the second member 30.

At this time, because the engaging claw 25 of the upstanding piece 24 collides with the projecting piece 36 within the through-hole 35 in which the projecting piece 36 has been formed, when an attempt is made to insert the upstanding piece 24 into the through-hole 35, the upstanding piece 24 cannot be inserted into the through-hole 35.

Accordingly, as mentioned previously, the periphery of the section of the second circular disc 32 where the through-holes 35 having the projecting piece 36 are formed (32a in FIG. 3) is reduced in thickness, relative to the thickness in other sections (to the periphery of the section where through-holes 35 having no projecting piece 36 are formed), thereby increasing the flexibility of the projecting piece 36 in the vertical direction (the axial direction of the second peripheral walls 31), and allowing the upstanding piece 24 to be inserted into the through-hole 35, through upward pushing of the projecting piece 36 by the engaging claw 25.

Next, in the state where all (three) of the upstanding pieces 24 have been inserted into all (three) of the through-holes 35, the second member 30 is rotated counterclockwise as shown by arrow A in the drawing, and the upstanding pieces 24 become inset between the second peripheral walls 31 and the protruding portions 37. Then, in the state where the upstanding pieces 24 have been inset between the second peripheral walls 31 and the protruding portions 37, the second member 30 is rotated until the upstanding pieces 24 are positioned between the two recesses 38 (see FIG. 4) formed on the upper face of the second circular disc 32.

In so doing, the upstanding pieces 24 are pushed toward the second peripheral walls 31, while the engaging claws 25 of the upstanding pieces 24 engage the second peripheral walls 31, and therefore vertical movement of the second member 30 relative to the first member 20 is restricted.

In the state where the second peripheral walls 31 have been engaged by the engaging claws 25 of the upstanding pieces 24, when the second member 30 is subjected, for example, to force inducing rotation in the disengagement direction of the engaging claws 25 and the second peripheral walls 31 (the clockwise direction), the side face of the upstanding piece 24 collides with the side of the projecting piece 36, and therefore rotation in the disengaging direction of the engaging claws 25 of the upstanding pieces 24 and the second peripheral walls 31 is also restricted.

Consequently, through engagement of the engaging claws 25 of the upstanding pieces 24 to the upper faces of the second peripheral walls 31, vertical movement of the second member 30 relative to the first member 20 is restricted, and rotation of the second member 30 relative to the first member 20 is restricted as well.

When the engaging claws 25 of the upstanding pieces 24 and the second peripheral walls 31 are disengaged, the projecting piece 36 may be pushed upward, in order that the side face of the upstanding piece 24 and the side of the projecting piece 36 do not collide when the second member 30 is rotated clockwise.

(Additional Example)

The present invention is not limited to the embodiment shown hereinabove, and various modifications are possible without departing from the objective of the present invention.

For example, in the aforedescribed embodiment, the second member 30 has the center holder (the center holder 33 in FIG. 3) for centering the magnet 40 and the yoke 50; however, the first member 20 may have the center holder instead. According to this configuration, the magnet 40 and the yoke 50 are centered automatically through positioning of the magnet 40 and the yoke 50 onto the magnet-positioning portion 231 of the first member 20, affording improved ease of assembly.

Additionally, projecting bosses that project toward the first circular disc 32 may be formed on the second peripheral walls 31 of the second member 30. When the second peripheral walls 31 are engaged by the engaging claws 25 of the upstanding pieces 24, the projecting bosses fit into the cutouts (interlock holes) 26, whereby, for example, when the second member 30 is subjected to force inducing rotation in the disengagement direction of the engaging claws 25 and the second peripheral walls 31 (the clockwise direction), the side faces of the projecting bosses collide with the inside peripheral walls of the cutouts (interlock holes) 26, and therefore rotation in the disengagement direction of the engaging claws 25 of the upstanding pieces 24 and the second peripheral walls 31 is restricted.

Additionally, in the outside peripheral portion of the first circular disc 22, holding pieces may be formed in such a manner that the distal ends project above the first circular disc 22, and the second peripheral walls 31 (the second member 30 having the second peripheral walls 31) are pushed upward when the second peripheral walls 31 are engaged by the engaging claws 25 of the upstanding pieces 24, whereby the engagement of the engaging claws 25 of the upstanding pieces 24 and the second peripheral walls 31 is strengthened.

The present invention can be utilized in an optical disc device provided with a disc clamper for chucking an optical disc.

What is claimed is:

1. An optical disc device, comprising:
a disc clamper, wherein
the disc clamper comprises a first member and a second member,
the first member including:
a first flat portion, and
a plurality of upstanding portions having engaging portions,
the second member including:
a second flat portion having a plurality of through-holes through which the plurality of upstanding portions are inserted,
a plurality of peripheral wall portions with which the engaging portions engage, and
a projecting portion flexible and projecting from a wall surface constituting one through-hole out of the plurality of through-holes toward a center beyond the peripheral wall portions,
wherein the plurality of upstanding portions are arranged between a side portion of the projecting portion and the wall surface.

2. The optical disc device of claim 1, wherein:
one end of the plurality of peripheral wall portions overlaps with part of the plurality of through-holes such that, when the plurality of upstanding portions are in a state inserted in the plurality of through-holes, the engaging portions do not engage with the plurality of peripheral wall portions.

3. The optical disc device of claim 2, wherein:
a width of the projecting portion in a circumferential direction is larger than a width of the projecting portion in a thickness direction, and
the periphery of a section of the second flat portion where the plurality of through-holes having the projecting portion are formed is reduced in thickness relative to the thickness of the periphery of a section where the plurality of through-holes having no projecting portion are formed.

4. The optical disc device of claim 3, wherein:
the plurality of through-holes have protruding portions opposite the one end of the plurality of peripheral wall portions, and
when the plurality of upstanding portions are rotated in a state inserted in the plurality of through-holes, the plurality of upstanding portions are held between the protruding portions and the plurality of peripheral wall portions.

5. The optical disc device of claim 4, wherein:
the first member forms a pair with a turntable and clamps the optical disc, and the second member is turnably supported on a clamper support.

* * * * *